United States Patent
Yeh

(10) Patent No.: US 7,220,033 B1
(45) Date of Patent: May 22, 2007

(54) CAR LAMP STRUCTURE

(75) Inventor: Keng-Chin Yeh, Taipei (TW)

(73) Assignee: Grang Fair Industrial Co., Ltd., Taipei (TW)

( * ) Notice: Subject to any disclaimer, the term of this patent is extended or adjusted under 35 U.S.C. 154(b) by 0 days.

(21) Appl. No.: 11/353,115

(22) Filed: Feb. 14, 2006

(51) Int. Cl.
*F21S 8/10* (2006.01)

(52) U.S. Cl. ..................... 362/545; 362/487

(58) Field of Classification Search ............... 315/77; 307/10.1; 362/459, 487, 523, 543–546, 549
See application file for complete search history.

(56) References Cited

U.S. PATENT DOCUMENTS

| | | | |
|---|---|---|---|
| 7,144,145 B2* | 12/2006 | Watanabe et al. | 362/544 |
| 2004/0184276 A1* | 9/2004 | Moll | 362/487 |
| 2004/0223335 A1* | 11/2004 | Yamamoto | 362/487 |
| 2005/0122737 A1* | 6/2005 | Watanabe et al. | 362/544 |
| 2005/0174790 A1* | 8/2005 | Suzuki et al. | 362/488 |
| 2005/0237760 A1* | 10/2005 | Tsukamoto et al. | 362/545 |

* cited by examiner

*Primary Examiner*—Thuy V. Tran
*Assistant Examiner*—Tung Le
(74) *Attorney, Agent, or Firm*—Rosenberg, Klein & Lee

(57) ABSTRACT

A car lamp includes a holding member, and several loop-shaped lighting members; the holding member has several lamp holding holes, a holding recess around each of the lamp holding holes, and several light passages communicating with each of the holding recesses; light sources are secured right behind respective ones of the light passages; each of the loop-shaped lighting members has equidistantly spaced light-condensing bumps thereon, and is fitted on a respective one of the holding recesses on the holding member; thus, change of the light sources is allowed, and light with a closed loop-shape will show on each of the loop-shaped lighting members when the light sources are powered.

1 Claim, 8 Drawing Sheets

CAR LAMP STRUCTURE

BACKGROUND OF THE INVENTION

1. Field of the Invention

The present invention relates to a car lamp, more particularly one, which includes several loop-shaped lighting members for making light from light sources show with a loop-shape, and look more uniform and brighter, and which is structured in such a way that change of the light sources is relatively easy.

2. Brief Description of the Prior Art

A car can be more easily seen if supplementary lighting elements are fitted near to or around the ordinary lights to help alert people to the car. Referring to FIGS. 8 and 9, an ordinary light 44 of a car is provided with a supplementary lighting element, which includes a support member 41, and a circular lighting body 42. The support member 41 has a circular trench 411, a through hole 412 on the circular trench 411, and several fitting portions 413 projecting in an opposite direction of the circular trench 411. The support member 41 is secured around the ordinary light 44 with the fitting portions 413 engaging an outer side of the ordinary light 44. The circular lighting body 42 includes a housing, and two light emitting diodes 43; the housing is made by means of injection molding; the light emitting diodes 43 are, before injection molding to make the housing, positioned in the mold so as to point in opposite directions; thus, the light emitting diodes 43 will be securely hidden in the housing and point in opposite directions as soon as injection molding is finished. A cord 431 is connected to the light emitting diodes 43. The circular lighting body 42 is securely fitted in the circular trench 411 of the support member 41 with the cord 431 being passed through the through hole 412.

Thus, when the light emitting diodes 43 are powered, the circular lighting body 42 will shine, thus helping alert people to the car.

However, the above supplementary lighting element is found to have the following disadvantages:

1. Because the light emitting diodes are buried in and securely joined to the housing right in injection molding to make the housing, they can't be separated from the housing, and the whole circular lighting body has to be replaced with a new one when any of the light emitting diodes is faulty. Therefore, the supplementary lighting element isn't economical to use.

2. The circular lighting body will only shine to show light with an opened circle-shape, without light being emitted from those portion thereof that are right around the light emitting diodes. In other words, the supplementary lighting element can't shine to show light with a closed circle-shape.

3. The supplementary lighting element can't show a closed circular light because there won't be any light emitted from those portion of the circular lighting body that are right around the joint between the light emitting diodes.

4. The light emitting diodes can be seen therefore they will spoil the look of the whole car light.

SUMMARY OF THE INVENTION

It is a main object of the invention to provide an improvement on a car lamp to overcome the above-mentioned problems. The car lamp of the present invention includes a holding member, light sources, and several loop-shaped lighting members. The holding member has several lamp holding holes, a holding recess around each of the lamp holding holes, and light passages communicating with the holding recesses. The light sources are secured right behind respective ones of the light passages on the holding member. Each of the loop-shaped lighting members is fitted on a respective holding recess on the holding member; thus, change of the light sources is allowed, and light with a closed loop-shape will show on each of the loop-shaped lighting members when the light sources are powered.

Furthermore, each of the loop-shaped lighting members has several equidistantly spaced light-condensing bumps thereon for making light emitted from the car lamp brighter and capable of alerting people effectively.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
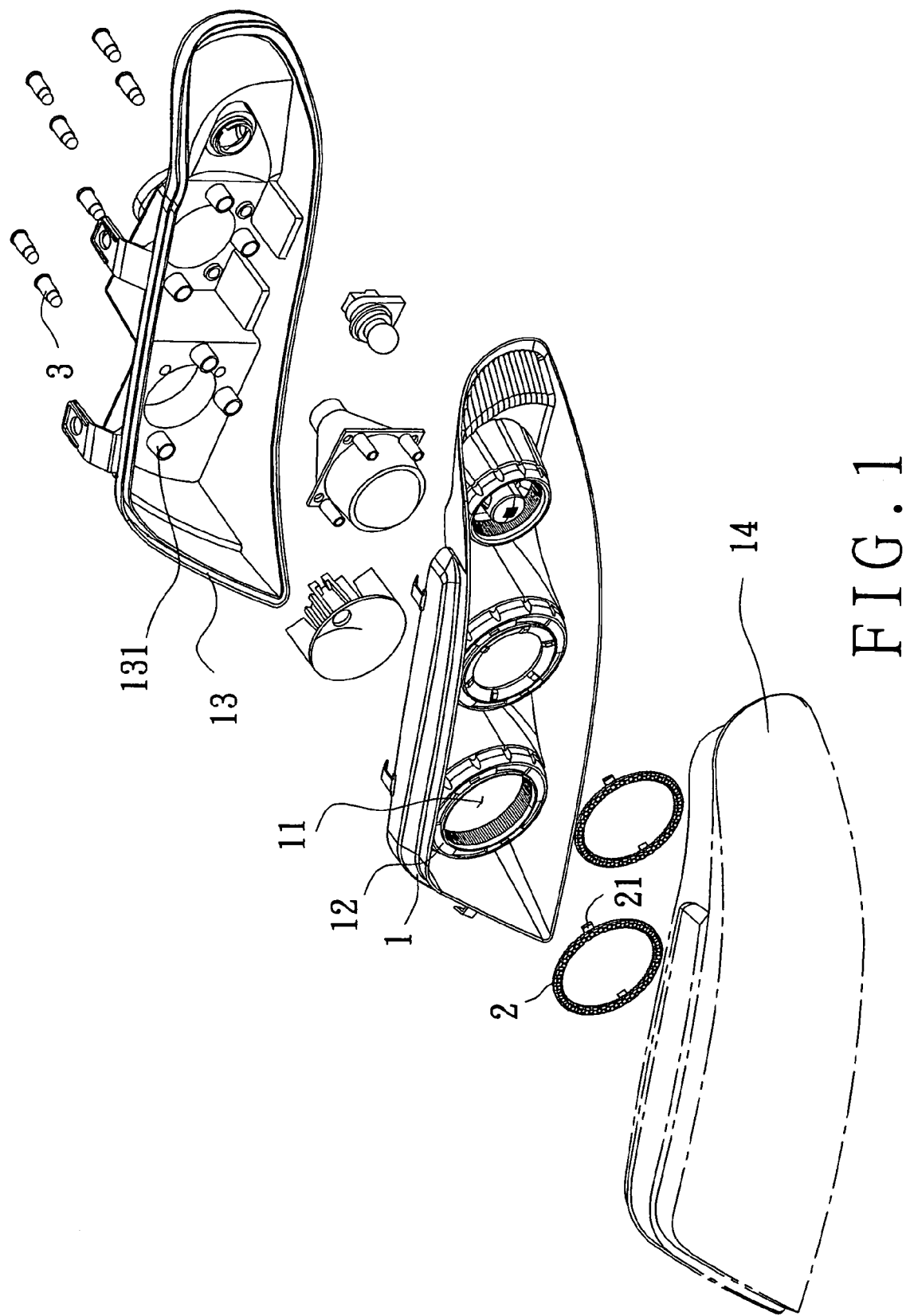
FIG. 1 is an exploded perspective view of the car lamp according to the present invention.
Figure 2:
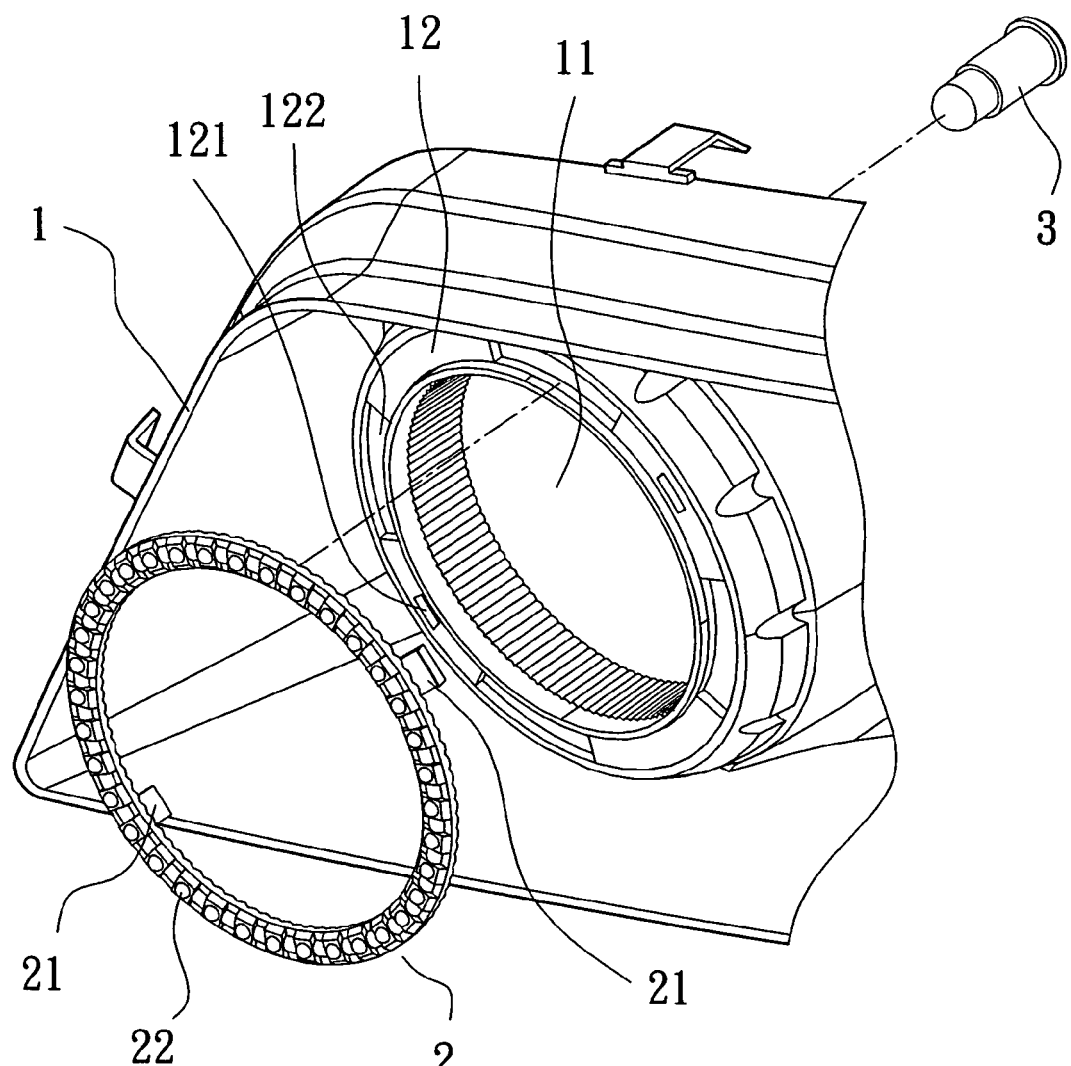
FIG. 2 is a partial exploded perspective view of the car lamp according to the present invention.

Referring to FIGS. 1 and 2, a preferred embodiment of a car lamp includes a holding member 1, several loop-shaped lighting members 2, and several light sources 3.

The holding member 1 is formed with several lamp holding holes 11 for holding lamps (not numbered) therein, and holding recesses 12 on a front side thereof, which are around respective ones of the lamp holding holes 11. Furthermore, the holding member 1 has several connecting holes 121 behind and in communication with the holding recesses 12, and several light passages 122 communicating with the holding recesses 12.

The rear cover 13 is formed with several fitting holes 131 on an outward side thereof, which will face respective ones of the light passages 122 when the rear cover 13 is joined to the holding member 1. The light sources 3 are fitted in respective ones of the fitting holes 131 of the rear cover 13. The light sources 3 can be light emitting diodes or bulbs.

Figure 4:
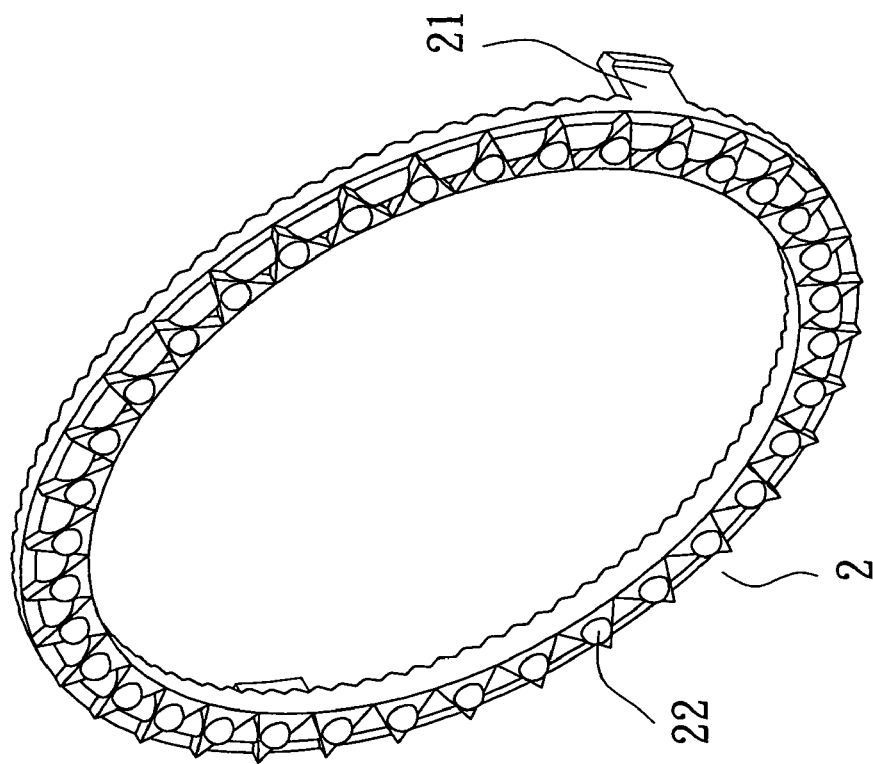
FIG. 4 is a third embodiment of the circular lighting body.
Figure 3:
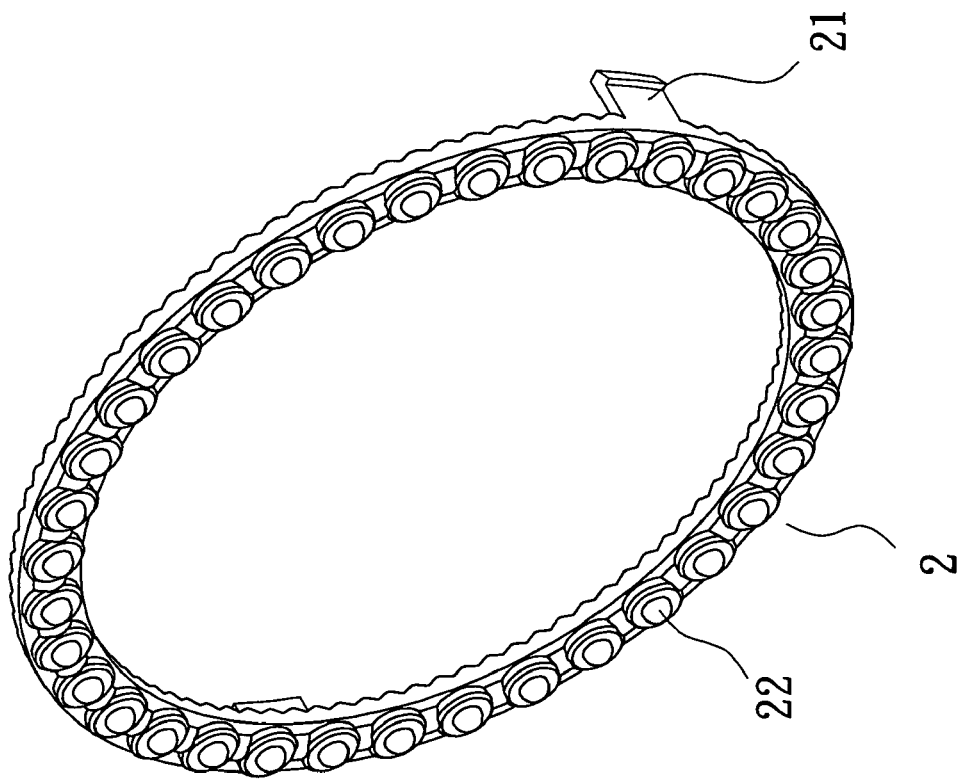
FIG. 3 is another embodiment of the circular lighting body in the present invention.
Figure 5:
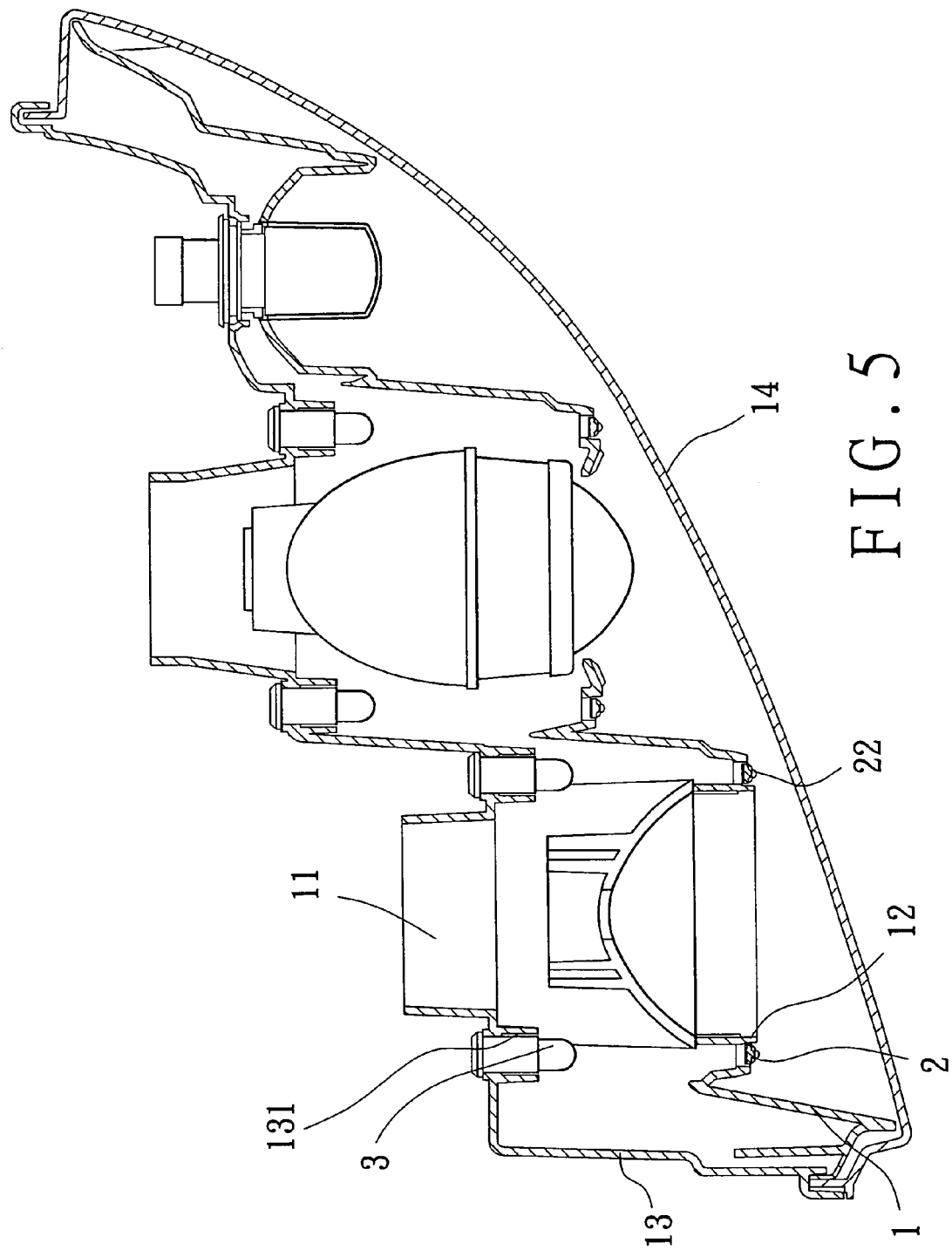
FIG. 5 is a sectional view of the car lamp of the present invention.
Figure 6:
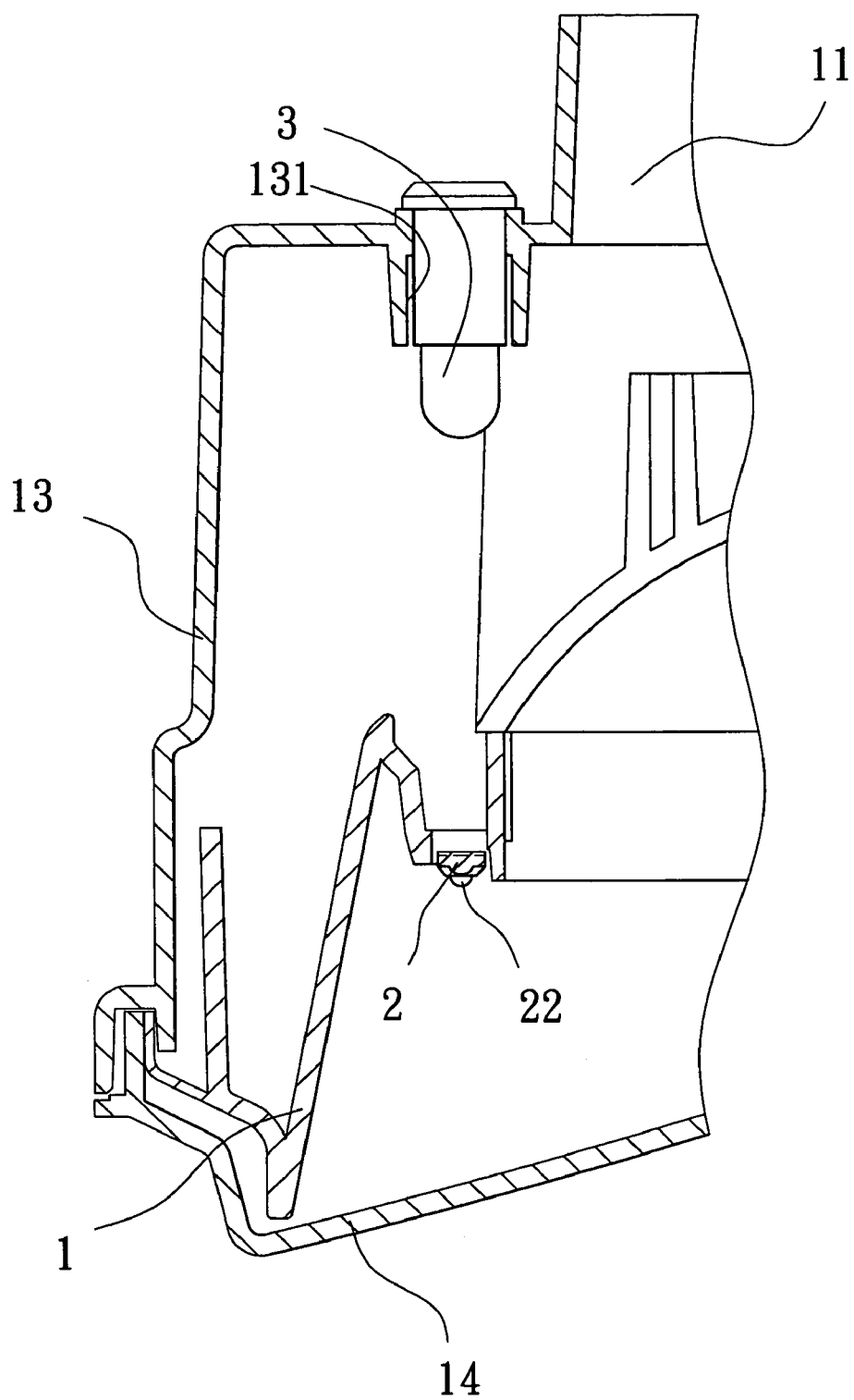
FIG. 6 is a partial sectional view of the car lamp of the invention.
Figure 7:
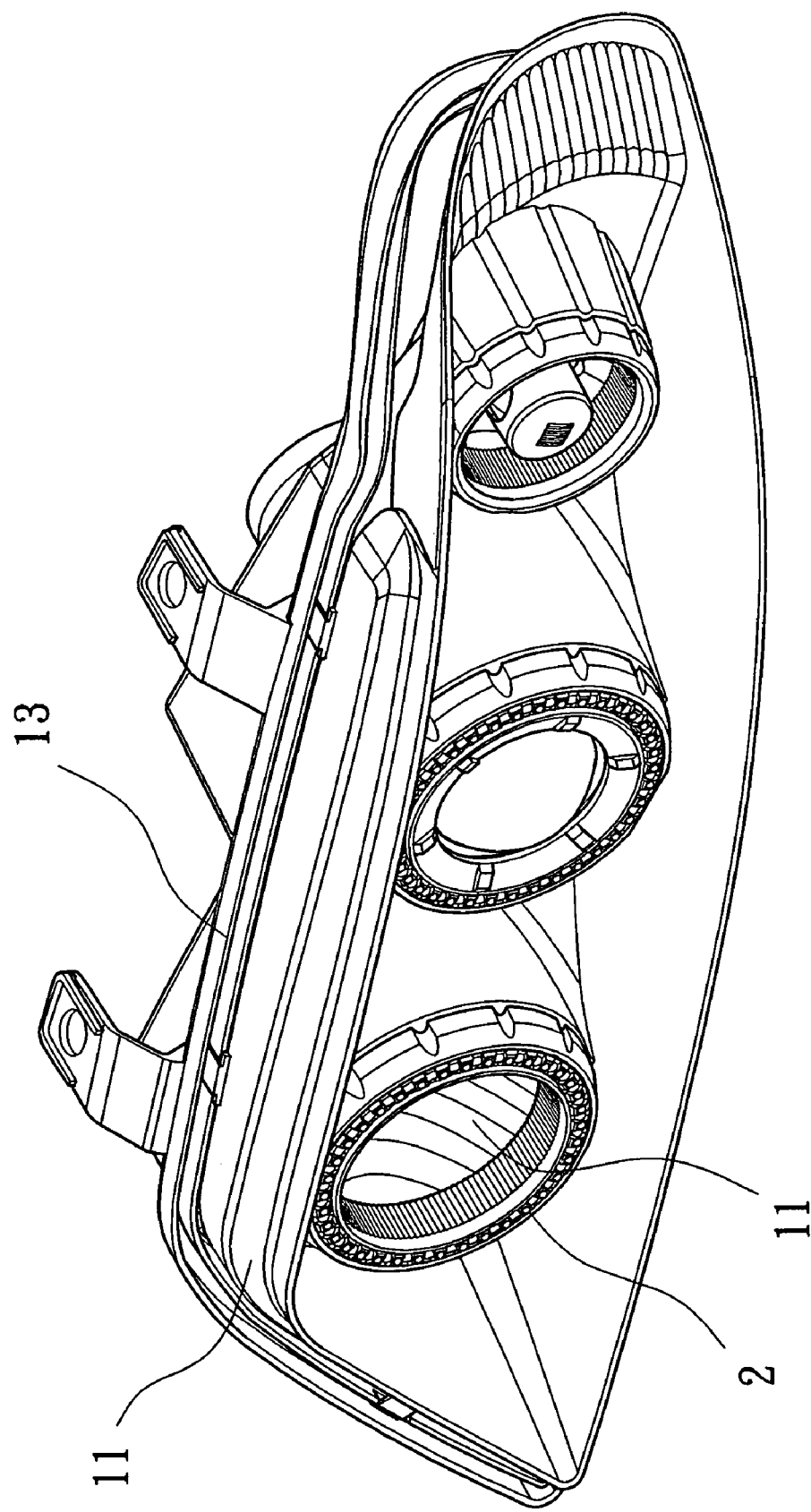
FIG. 7 is a perspective view of the car lamp of the invention.
Figure 8:
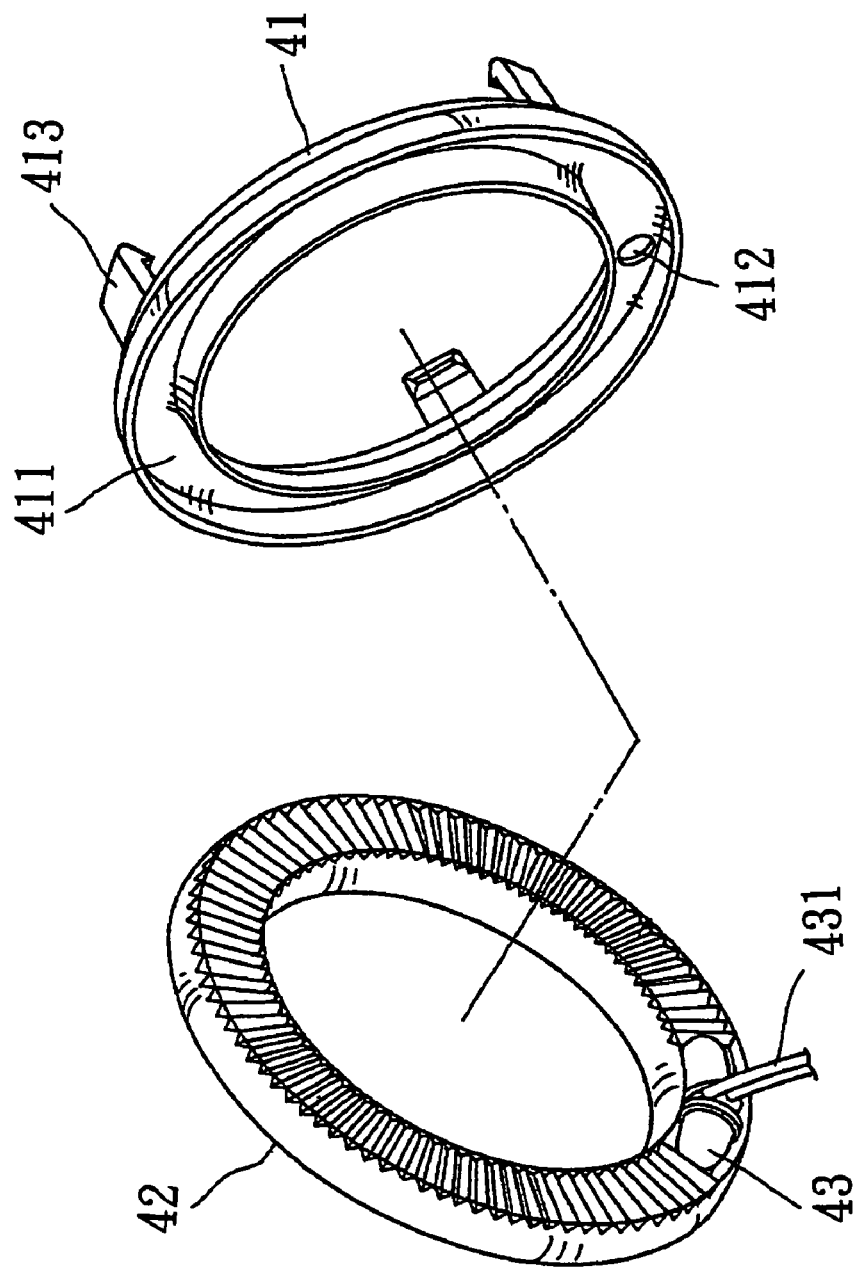
FIG. 8 is an exploded perspective view of the currently existing car lamp described in Background.
Figure 9:
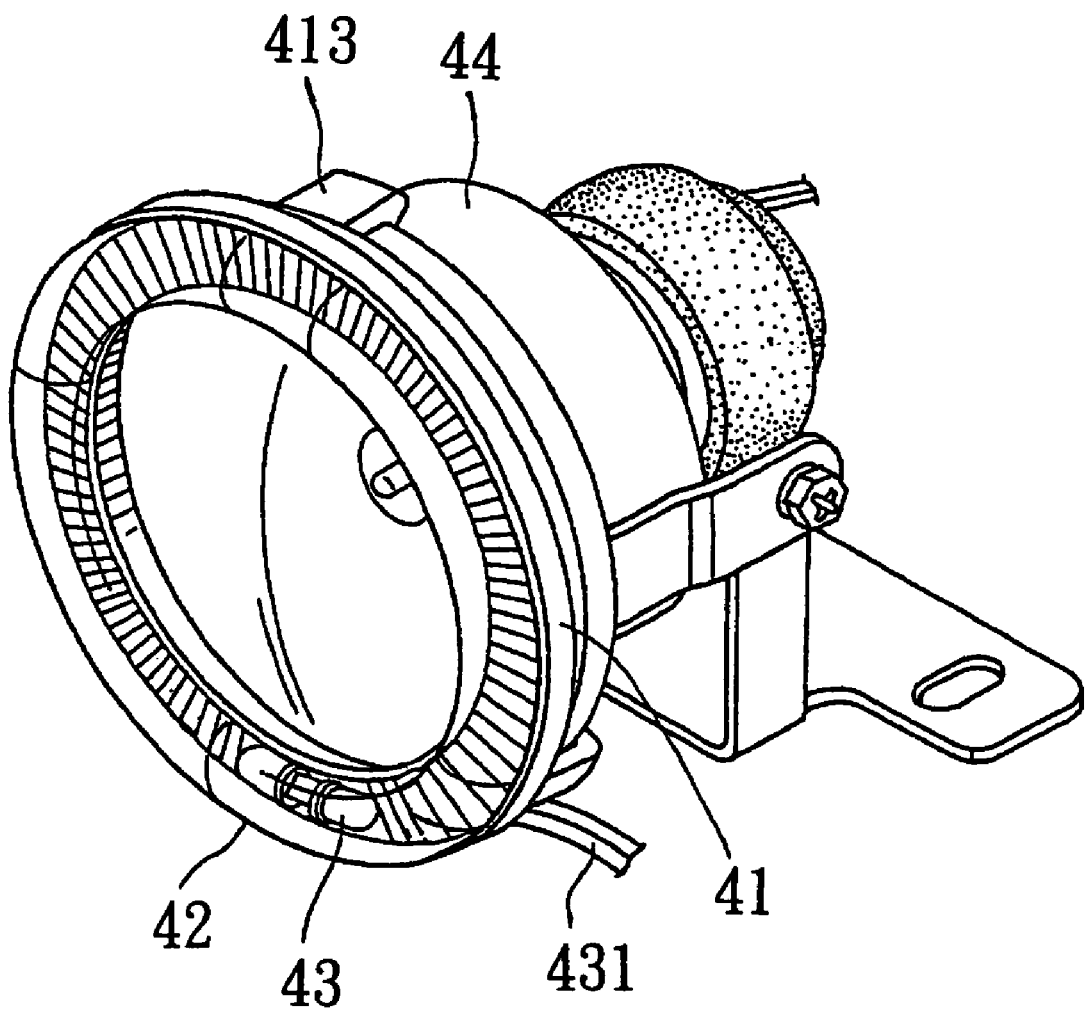
FIG. 9 is a perspective view of the currently existing car lamp.

Each of the loop-shaped lighting members 2 has several equidistantly spaced light-condensing bumps 22 on an outward side thereof, and several fitting portions 121, which project inwards. In addition, referring to FIGS. 3 and 4, the loop-shaped lighting members 2 can come in various designs; thus, they will produce different visual effects when the car lamp is powered.

In assembling, referring to FIGS. 2 to 7, first the loop-shaped lighting members 2 are fitted on respective ones of the holding recesses 12 of the holding member 1 with the fitting portions 21 thereof being passed into the connecting holes 121 to engage the holding member 1. Next, the light sources 3 are securely fitted in respective ones of the fitting holes 131 of the rear cover 13. And finally, the rear and the front covers 13 and 14 are securely joined to the holding member 1.

Thus, when the light sources 3 are powered to emit light, the light will travel to the loop-shaped lighting members 2 through the light passages 122 of the holding member 1; thus, the light is refracted by the loop-shaped lighting members 2 to have a closed loop-shape, and travels outside. And, the light condensing bumps 22 on the loop-shaped lighting members 2 will make the car lamp look brighter. Consequently, the car lamp of the present invention can help alert people to the car effectively.

From the above description, it can be easily understood that the car lamp of the present invention has advantages as followings:

1. The light sources are detachably fitted in the fitting holes of the rear cover therefore if any of the light sources is faulty, it can be replaced individually, and the rear cover doesn't have to be replaced together with the light sources. Consequently, the present invention is relatively easy and economical to maintain as compared with the prior art.

2. Because light will be, when emitted from the light sources, refracted by the loop-shaped lighting members, the car lamp of the present invention will shine to show light with a closed loop-shape thereon instead of an opened loop-shape.

3. The light sources are arranged on the rear cover, and hidden behind both the holding member and the front cover therefore they can't show to spoil the look of the whole car lamp.

4. The loop-shaped lighting members are directly fitted around the lamp holding holes of the holding member therefore their use is flexible, not limited to certain types of cars.

5. The loop-shaped lighting members can come in various designs, which produce different visual effects. Therefore, the car lamp of the present invention can alert people to the car effectively.

6. The present invention can be used on front lights as well as rear lights of a car to increase safety of driving.

What is claimed is:

1. An improvement on car lamp structure, comprising a holding member, the holding member having a plurality of lamp holding holes; the holding member having a plurality of holding recesses, which are around respective ones of the lamp holding holes; the holding member having a plurality of connecting holes thereon, which face and communicate with the holding recesses; the holding member having a plurality of light passages communicating with each of the holding recesses; the holding member having a rear cover joined thereto; the rear cover having a plurality of fitting holes facing respective ones of the light passages of the holding member;

a plurality of loop-shaped lighting members, each of the loop-shaped lighting members having a plurality of equidistantly spaced light-condensing bumps on an outward side; each of the loop-shaped lighting members having a plurality of fitting portions on an inward side; the loop-shaped lighting members being fitted on respective holding recesses on the holding member with the fitting portions being passed into the connecting holes and connected to the holding member; and a plurality of light sources, the light sources being fitted in respective ones of the fitting holes of the rear cover;

whereby light with a closed loop-shape will show on each of the loop-shaped lighting members when the light sources are powered.

\* \* \* \* \*